United States Patent
Haas et al.

(10) Patent No.: US 6,850,867 B2
(45) Date of Patent: Feb. 1, 2005

(54) SYSTEM AND METHOD FOR THE MONITORING OF A MEASUREMENT AND CONTROL DEVICE

(75) Inventors: Wolfgang Haas, Korntal Muenehingen (DE); Andreas Frank, Sindelfingen (DE); Thomas Meier, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 10/257,806

(22) PCT Filed: Apr. 6, 2001

(86) PCT No.: PCT/DE01/01342

§ 371 (c)(1),
(2), (4) Date: Feb. 28, 2003

(87) PCT Pub. No.: WO01/79948

PCT Pub. Date: Oct. 25, 2001

(65) Prior Publication Data

US 2003/0154762 A1 Aug. 21, 2003

(30) Foreign Application Priority Data

Apr. 14, 2000 (DE) .......................................... 100 18 859

(51) Int. Cl.$^7$ ................................................. G06F 19/00
(52) U.S. Cl. ........................ 702/182; 702/183; 702/184
(58) Field of Search ................................ 702/182, 183, 702/184, 185; 701/29, 31, 34

(56) References Cited

U.S. PATENT DOCUMENTS

| | | | | |
|---|---|---|---|---|
| 4,797,828 A | * | 1/1989 | Suzuki et al. | ................ 701/102 |
| 5,152,178 A | | 10/1992 | Kadota | |
| 5,671,981 A | * | 9/1997 | Sasaki et al. | .......... 303/122.06 |
| 5,691,611 A | * | 11/1997 | Kojima et al. | ............... 318/254 |
| 5,830,106 A | * | 11/1998 | Abe | ............................ 477/98 |
| 5,850,514 A | * | 12/1998 | Gonda et al. | .................. 714/55 |
| 6,556,900 B1 | * | 4/2003 | Brynielsson | .................. 701/29 |
| 6,606,551 B2 | * | 8/2003 | Ito | .............................. 701/114 |
| 2001/0015197 A1 | * | 8/2001 | Elliott et al. | ............ 123/406.16 |

FOREIGN PATENT DOCUMENTS

| | | |
|---|---|---|
| DE | 40 04 083 | 8/1991 |
| JP | 61 075 405 | 4/1986 |

* cited by examiner

*Primary Examiner*—Patrick Assouad
(74) *Attorney, Agent, or Firm*—Kenyon & Kenyon

(57) ABSTRACT

Described is a system and a method to monitor measuring and control equipment. The occurrence of a malfunction does not immediately lead to the monitoring system entering a secure state, but rather increases the count of a counter. If the count exceeds a certain value, then the monitoring system enters a secure state.

15 Claims, 4 Drawing Sheets

SYSTEM AND METHOD FOR THE MONITORING OF A MEASUREMENT AND CONTROL DEVICE

FIELD OF THE INVENTION

The present invention relates to a system for monitoring equipment for measuring, controlling, and regulating and a corresponding method.

BACKGROUND INFORMATION

Known monitoring systems for measuring and control equipment allow for the system to enter a so-called secure state in response to a malfunction occurring. The secure state either causes the current operating state of the measuring and control equipment to change or prevents the operating state from being changed at a later time. One can then provide for, e.g. the measuring and control equipment, the system controlled by the measuring and control equipment, or the measuring and control equipment and the controlled system, being switched off in response to the occurrence of a malfunction.

A system for controlling and/or regulating an internal combustion engine is known from German Published patent Application No. 40 04 083. This includes several sensors, which generate signals that represent the operating parameters of the internal combustion engine. Malfunction detection is carried out, using these signals. The malfunction monitoring occurs within predefined sub-ranges having a lower sensitivity than outside of these predefined sub-ranges. If a malfunction is detected, then it can initially be checked if this can be attributed to impaired or incomplete signal transmission. The system is only switched off, when this is not the case. In this manner, the system is prevented from switching off in response to a malfunction of one of the sensors.

A disadvantage of the described system is that the system is immediately switched off in response to the occurrence of certain malfunctions. This indeed means that the safety of operation is high, but also that the availability is insufficient.

SUMMARY OF THE INVENTION

Therefore, an object of the present invention is to propose a device and a method for monitoring measuring and control equipment, which ensure both ample operational safety and satisfactory availability.

The system of the present invention to monitor equipment for measuring, controlling, and regulating has a monitoring device, which monitors the method of functioning of the measuring and control equipment. In this context, malfunctions of the monitored measuring and control equipment are detected. In addition, the monitoring device may control the operating state of the equipment. The system distinguishes itself in that a counter having a count is provided, the detection of a malfunction increases the count, and the operating state of the measuring and control equipment is controlled as a function of the count.

A malfunction is indeed detected, but does not necessarily or directly result in the operating state of the measuring and control equipment being controlled, i.e. result in the measuring and control equipment possibly being switched off. Initially, the occurrence of a malfunction only leads to the count of the counter being increased. This only results in disconnection, when the count reaches a certain, predetermined value. This value is variable and represents the reaction threshold of the monitoring device. By selecting the reaction threshold, the user has the option of setting his system for monitoring with regard to operational safety and availability, in accordance with his requirements.

The monitoring device preferably monitors the method of functioning of the measuring and control equipment, using communications operations carried out at regular time intervals. Each communications operation, which includes an exchange of data between the monitoring device and the measuring and control equipment, yields either a malfunction or correct functioning. Therefore, the reaction time of the monitoring system may also be determined by the choice of intervals between the communications operations.

In a preferred, specific embodiment, the detection of correct functioning reduces the count of the counter. This prevents sporadically occurring malfunctions from resulting in the measuring and control equipment being switched off, since detected instances of correct functioning reduce the count again and again.

It is advantageous, when the count is to be controlled independently of the occurrence of malfunctions. This makes sense when the predetermined reaction threshold appears to be too high in some operating states. For example, the measuring and control system may keep the counter of the monitoring device just below the reaction threshold, using deliberate, false information. This holding of the counter is maintained for the duration of the special operating state that is critical with regard to safety. Consequently, the short reaction time from the occurrence of a fault to the reaction of the monitoring device provides the monitoring system with the maximum possible safety.

According to a particularly preferred specific embodiment of the system of the present invention, the count of the at least one counter is compared to a threshold value, a reset or a fault reaction being triggered in response to the threshold value being reached or exceeded. In practice, the monitoring of such a threshold value turns out to be simple and reliable.

A second counter level is advantageously defined below the threshold value, the count not being allowed to fall below the second counter level, and an artificially generated malfunction being input into the system in response to the second counter level being reached.

In this connection, it is conceivable for the reaction threshold or the threshold value to be adjustable or variable. This measure makes it possible to adjust to specific operating states.

The variation of this second counter level also allows the desired availability or reaction time of the system to be flexibly adjusted.

Therefore, depending on the situation, one may also select between maximum safety and maximum availability during continuous operation, with an arbitrary number of graduations.

According to a particularly preferred embodiment of the system of the present invention, a first fault counter assigned to the monitoring device and a second fault counter assigned to the equipment to be monitored are provided, which may be periodically checked and/or compared to each other in order to monitor the system. This measure allows the function of the equipment to be monitored to be checked, using the first counter, and allows the function of the monitoring device to be checked, using the second fault counter. A periodic comparison of the counts of these two fault counters also allows so-called sporadic faults to be detected in a simple manner, as will be explained later in the specification.

In this context, it is advantageous that the first fault counter may be used for counting an image of the second fault counter's count. Therefore, the so-called expected value of the second fault counter may be stored, using the first fault counter.

A third fault counter, which is used to compare the counts of the first and second fault counters, is advantageously provided.

The method of the present invention provides for a counter being used whose count is increased in response to detecting malfunctions, and for the control of the operating state of the monitored equipment being carried out as a function of the count.

The method of functioning of the measuring and control equipment is preferably executed, using communications operations performed in regular intervals. Each communications operation reveals either a malfunction or correct functioning.

It is advantageous, when correct functioning is registered by a reduction in the count of the counter. This ensures that sporadically occurring malfunctions also do not result in the operating state of the measuring and control equipment being influenced.

The count may advantageously be controlled independently of the occurrence of malfunctions. Thus, the reaction time of the monitoring system may be adapted to current requirements during continuous operation.

DETAILED DESCRIPTION

Figure 1:
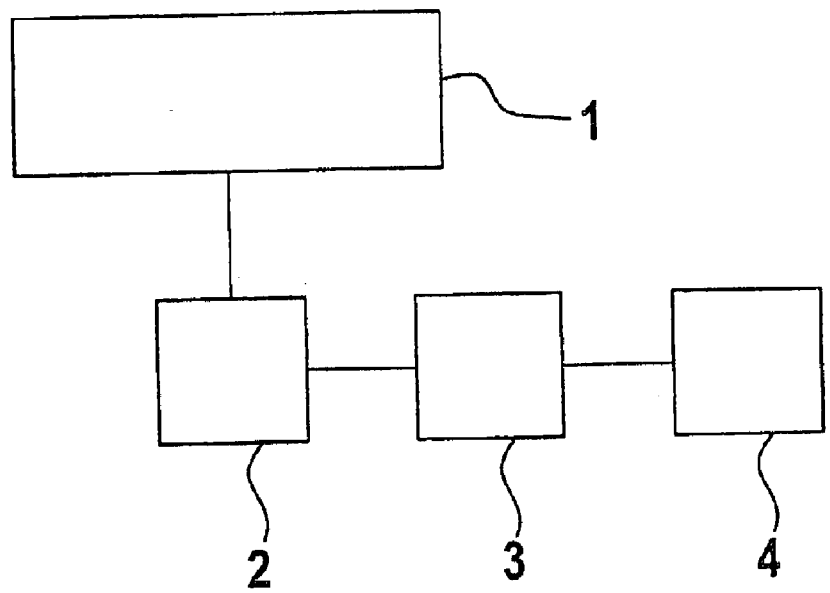
FIG. 1 shows a schematic representation of a preferred specific embodiment of the monitoring system according to the present invention.

FIG. 1 shows, in a schematic representation, a preferred specific embodiment of the monitoring system according to the present invention, in use. Shown is an internal combustion engine 1, equipment 2 for measuring, controlling, and regulating (measuring and control equipment), a monitoring device 3, and a counter 4.

Internal combustion engine 1 is controlled with the aid of measuring and control equipment 2. Measuring and control equipment 2 is in turn monitored by monitoring device 3. This monitoring is accomplished by communications operations between monitoring device 3 and measuring and control equipment 2. If a malfunction is detected, the count of counter 4 is increased. If correct functioning is registered, then the count is reduced. As soon as the count reaches a certain value, monitoring device 3 assumes a secure state. This results in measuring and control equipment 2, and possibly internal combustion engine 1 as well, being switched off.

Figure 2:
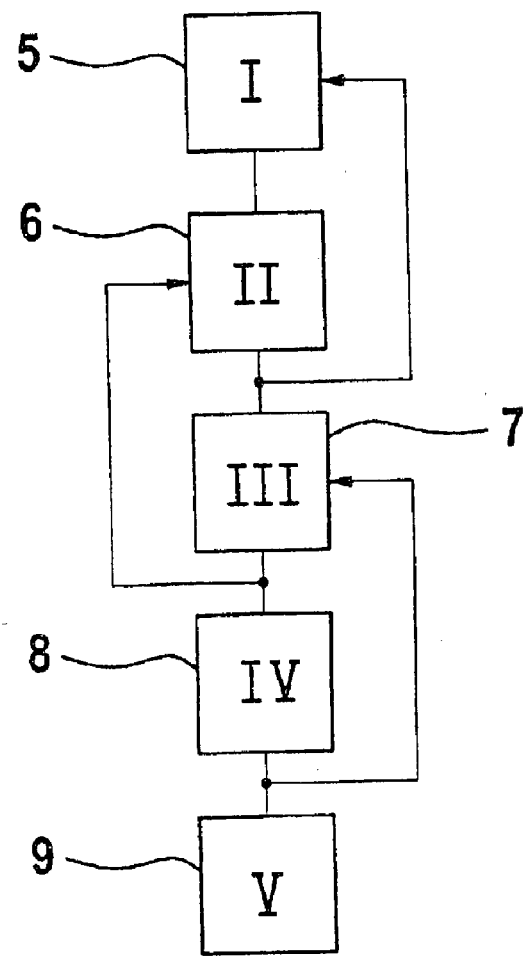
FIG. 2 shows a diagram for explaining a preferred specific embodiment of the method according to the present invention.
Figure 3:
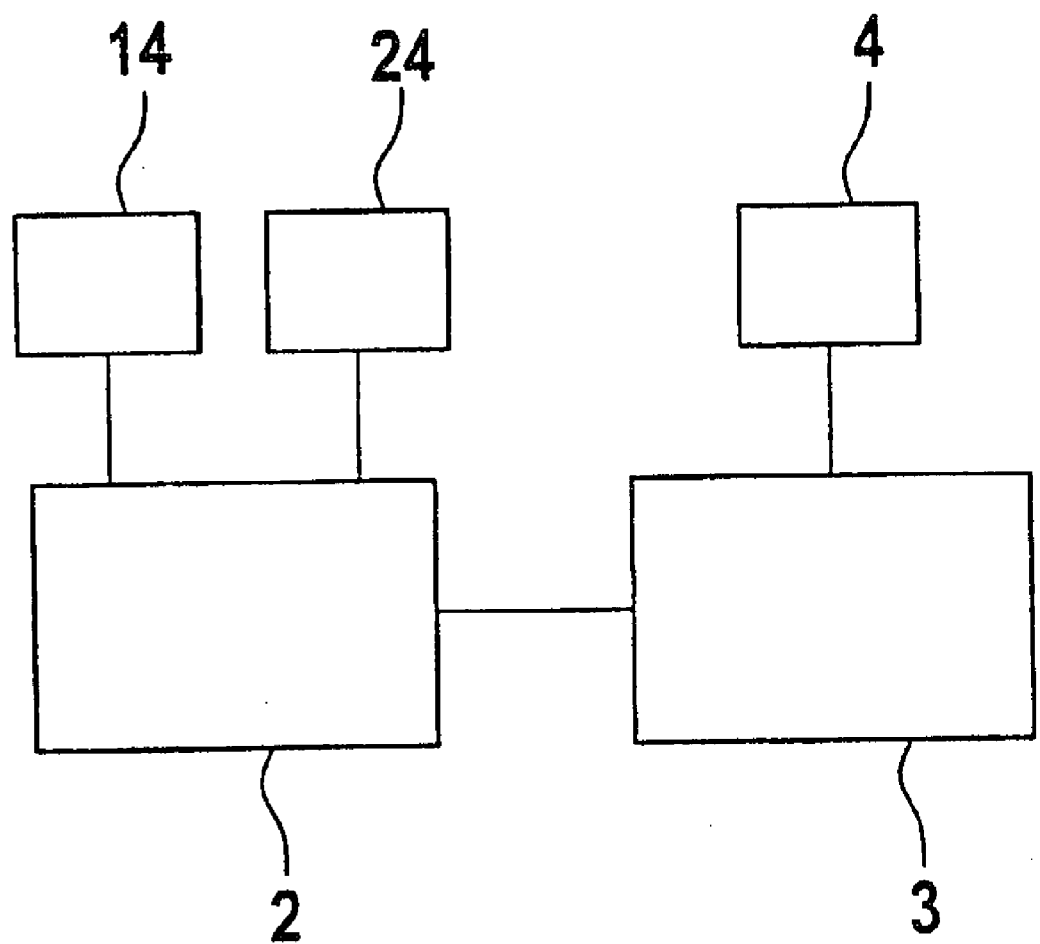
FIG. 3 shows a representation corresponding to FIG. 1, of a further preferred embodiment of the monitoring system according to the present invention, the (schematic) representation of the internal combustion engine being dispensed with in this case.

In a diagram, FIG. 2 explains the execution of a preferred specific embodiment of the method according to the present invention. The Roman numerals in the drawing represent the count.

The count is I in state 5. After a certain time span, a communications operation occurs between monitoring device 3 and measuring and control equipment 2. If a malfunction is meanwhile detected, then the count is increased to II, as is represented in state 6. A further communications operation occurs again, after a certain time span. If a malfunction is detected, then the count is increased to III, which corresponds to state 7. The count is otherwise reduced to I, which corresponds to state 5. If the count is III, in accordance with state 7, then the detection of correct functioning causes the count to be reduced to II, state 6. If a malfunction is detected in state 7, then the count is increased to IV, which corresponds to state 8. A communications operation is repeated in state 8. If this detects correct functioning, then the count decreases to III, i.e. state 7. If a malfunction is detected in state 8, then the count is increased to V, which corresponds to state 9. This count causes monitoring system 3 to assume the secure state. As a result, measuring and control equipment 2 and internal combustion engine 1 are switched off. Therefore, a count of V represents the reaction threshold of the monitoring system for the exemplary embodiment shown.

According to a further preferred embodiment, the system and method of the present invention may be implemented, using a number of cooperating fault counters. This is described below in light of a function-computer monitoring module, using three fault counters: A first fault counter 4 is provided in monitoring module 3 of measuring and control equipment (function computer) 2. A second fault counter 14, which is a copy of fault counter 4, is provided in measuring and control equipment 2. The task of fault counter 4 is to count incorrect responses of measuring and control equipment 2. Fault counter 14 in measuring and control equipment 2 is used to store the expected value of fault counter 4. A further fault counter 24, which counts inconsistencies between counters 4 and 14, is advantageously provided in the measuring and control equipment.

The following strategy is, for example, applicable to the counters: For example, it is assumed that the operating state of measuring and control equipment 2 is controlled in response to the count value of fault counter 4 reaching 13. In the following, this is assumed to be a reset. One starts, for example, with a beginning count of 11, in order to prevent a defective measuring and control device from being activated after initialization. If a correct response, e.g. from measuring and control equipment 2, reaches fault counter 4, its count is reduced by 1 (this always occurs in the case of a correct response, if the count is greater than 0). If an incorrect response is detected, then three fault points are added. In the case in which a count greater than or equal to 13 is reached, a reset of the measuring and control equipment is triggered.

To check if monitoring module 3 is functioning correctly, measuring and control equipment 2 purposely sprinkles incorrect responses in at an appropriate count of fault counter 4, in order to check if, and to what extent, monitoring module 3 detects incorrect responses and its fault counter 4 accordingly counts these responses correctly. Since, for example, the system only allows the measuring control equipment to detect the current count of counter 4 every 32nd inquiry-response communication (communications frame), fault counter 14 in the measuring and control equipment is used internally in the measuring control equipment to count a representation of fault counter 4. Therefore, fault counter 14 contains the so-called expected value of fault counter 4. If monitoring module 3 signals the count of its fault counter 4 in place of the 32nd inquiry in the cycle, then the measuring and control equipment compares the expected value, i.e. the count value of fault counter 14, to the signaled value, i.e. the count value of fault counter 4. If these two count values do not agree, then third fault counter 24 is increased by three points. If there is agreement, then the count value of fault counter 24 is decreased by 1.

Fault-tolerance times must continually be taken into consideration in systems for monitoring measuring and control equipment. In the exemplary embodiment described here, the monitoring plan is hierarchically constructed in three levels, the first level being formed by measuring and control equipment 2, which is monitored by the second level, an internal software check test not represented in detail. The third level, which is essentially monitored by monitoring module 3, is used to monitor the second level, i.e. the hardware, which is used to carry out the software monitoring.

If, according to a first case constellation, a fault occurs on the first level, i.e. in the measuring and control device, then the tolerance time is a function of the reaction speed of the second level, i.e. of the internal software monitoring, which advantageously has direct access to the output stages of the measuring and control equipment.

Such an access path via a computer pin typically carries the name of "PEN" (=Power ENable) and switches, for example, the actuator system of a connected motor to high resistance.

An example of another case is the occurrence of a fault in the computer hardware (measuring and control hardware), which means that the fault has to be detected via the third level.

A hardware fault results in an incorrect response of the measuring and control equipment. In this case, monitoring module 3 detects the incorrect response and repeats, for example, the inquiry that was responded to incorrectly, until the response is correct. If, in this connection, fault counter 4 exceeds its reaction threshold before the inquiry is responded to correctly, then monitoring module 3 triggers a reset of measuring and control equipment 2. The fault-tolerance time now depends on how many false responses must be received in order for fault counter 4 to exceed the reaction threshold. When the fault counter has a count of 0, then, for example, five incorrect responses must be received in succession, in order to exceed the threshold of 13 selected for purposes of illustration. In the case in which each inquiry-response communication typically lasts 40 ms, the result here is a monitoring-module reaction time of approximately 200 ms.

Since a representation of fault counter 4 is logged in the measuring and control equipment, using fault counter 14, fault counter 4 may be influenced by deliberate, incorrect responses, in order to keep it closer to the reaction threshold. However, this brings an unknown variable to the forefront, namely the occurrence of so-called "sporadic faults". These are faults, which occur randomly due to effects that are mostly external, and are unpredictable. The monitoring module detects an incorrect response and advances its fault counter 4. Of course, these faults may not be logged in the expected value of counter 14, since the measuring and control equipment assumes that the response was transmitted correctly. These discrepancies are discovered when fault counter 4 signals back in place of every 32nd inquiry, and they result in an increase in the count of counter 24.

Rare faults that occur sporadically should not lead to a reset of the system, when this adversely affects the user. Of course, this condition limits the possibilities of decreasing the fault-tolerance time, using the "level control" of the fault counter in the measuring and control equipment. However, frequent, sporadic faults should not lead to a reset, EMC-contaminated, high voltage lines being named here as an example, and these high voltage lines not being able to ensure safe operation.

The stipulation, that a rare, sporadic fault should not result in an immediate reset of the system, is explained by way of example: This means that counter 4 is allowed to reach a maximum count of 10, in spite of the incorrect responses that are sprinkled in: Fault counter=10—>correct response—>fault counter=9—>correct response—>fault counter=8—>correct response—>fault counter=7—>deliberately incorrect response—>fault counter=10—>. . .

The occurrence of a sporadic fault increases the count of counter 4 by three points, i.e. this would result in a count of 13. In the case of a fault count of 7, the maximum time leading up to a reaction is the duration of three incorrect responses, i.e. 3×40 ms=120 ms.

Since the counter 14 in the measuring and control equipment may only be adjusted to the true count of the counter 4 in monitoring module 3 after every 32nd communications frame, only a sporadic fault may occur within this time, since this uses up the reserve for this time frame. Therefore, sporadic faults may only occur at a minimum interval of 31 frames=31×40 ms=1.24 s. Otherwise, they trigger an (unwanted) reset. If two sporadic faults are permissible within a time of 1.24 s, the maximum tolerance time that occurs increases to 160 ms (admissibility of an additional incorrect response). To assess the frequency of sporadic faults occurring, it is necessary to conduct trials in the real system.

In order to reduce the risk of a reset due to sporadic faults, the "level control" of the count of counter 4 may be implemented as a function of the driving situation. The manner, in which the "counter level" is controlled most effectively, depends on various boundary conditions (required tolerance time, required fault sensitivity, etc.) and must be tested in the real system, as well.

It should be pointed out that, in monitoring module 3, the RAM test may be designed as a writability test, so that a so-called "sleeping fault" may be formed. If a bit inverter produces too low a value in fault counter 4, then the strategy of "level control" may fail.

In a third case, the communication may break down for unknown or arbitrary reasons, so that monitoring module 3 detects the response after, e.g. a 10.51 ms timeout, switches off the output stages of the measuring and control device, and triggers a reset. In the worst case, even the time for posing an inquiry, e.g. 100 ms, must be included, so that in the worst case, one must expect a delay time of 20.51 ms.

Figure 4:
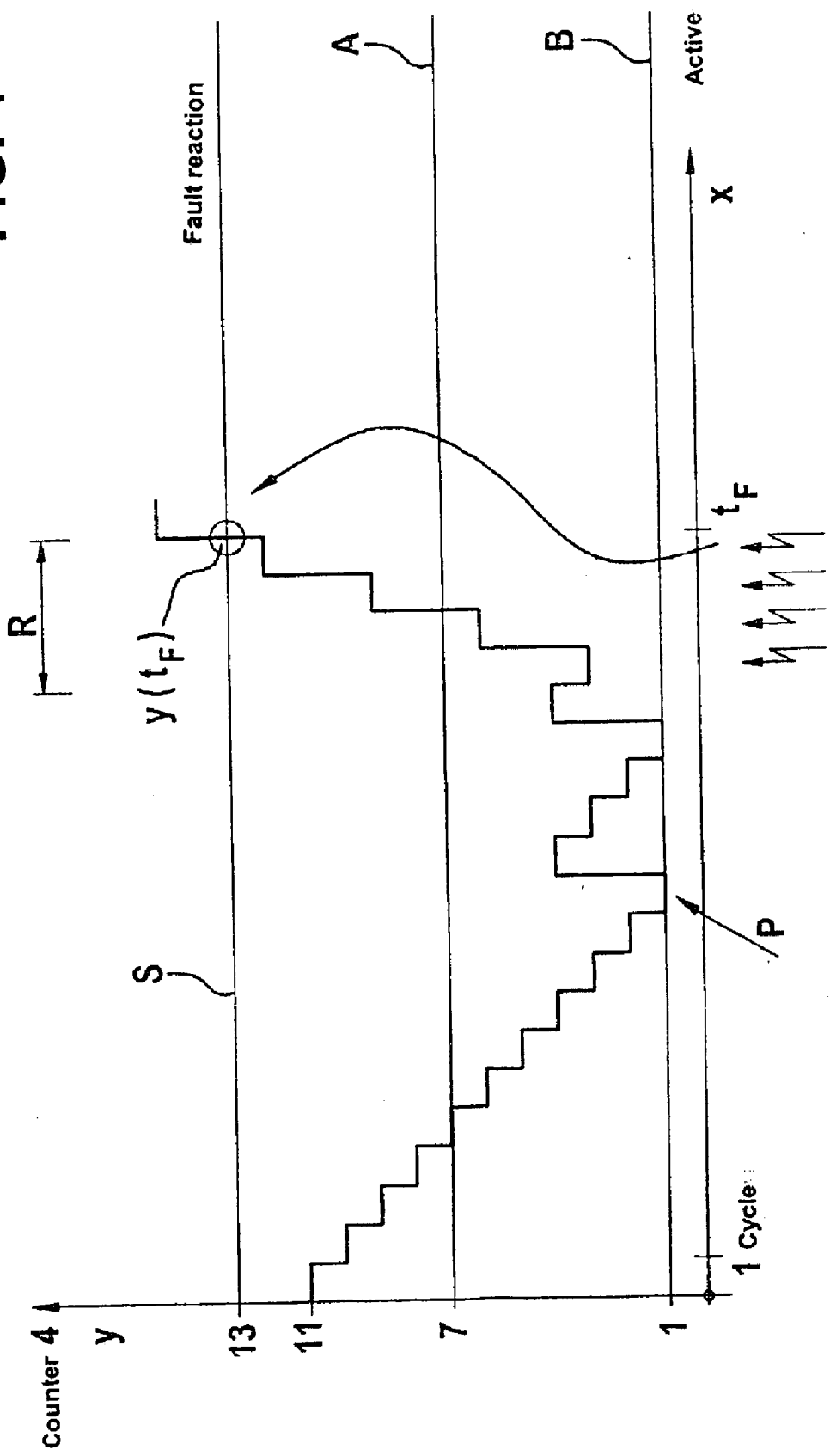
FIG. 4 is a first diagram for explaining a possible time sequence of the method according to the present invention.
Figure 5:
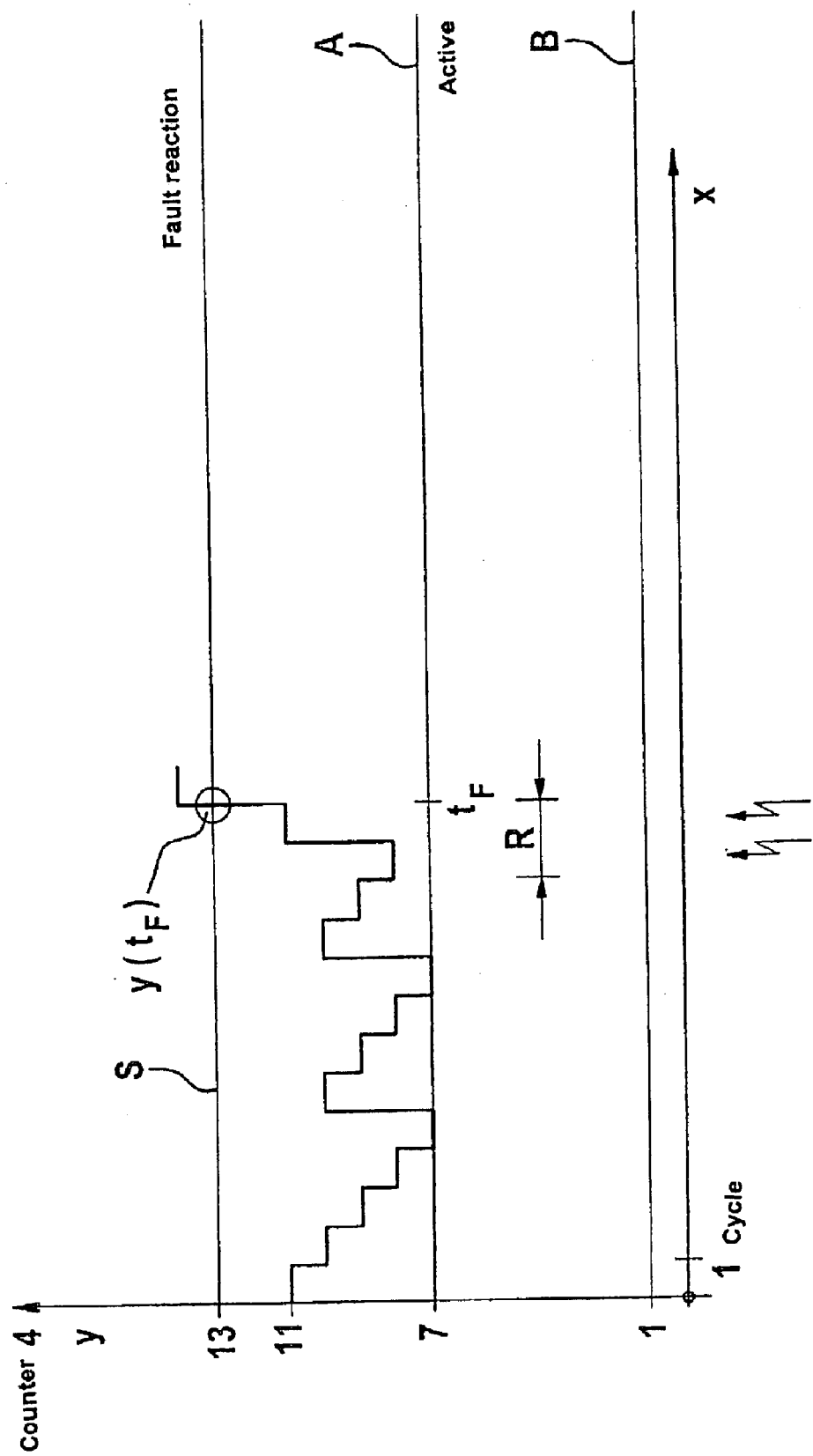
FIG. 5 is a second diagram for explaining a possible time sequence of the method according to the present invention.

The method according to the present invention is explained once more by way of example, using the graphs of FIGS. 4 and 5.

In these graphs, the x axis represents the time (subdivided into individual cycles), and the y axis represents the count of counter 4.

Drawn into FIG. 4 are 3 special counter readings, which will be explained in detail. Count 13 is a threshold value, which may not be exceeded. In the case in which this threshold value is exceeded, the result is a reset or a fault reaction of the system or the count. A counter level A is drawn in at count 7, and a counter level B is drawn in at count 1. This should make clear that, according to a preferred specific embodiment of the method of the present invention, a second counter level located below the threshold value is variable. According to the specific embodiment represented in FIG. 4, counter level B (count 1) is active, i.e.

the count may decrease to a value of 1, before an incorrect response that is artificially sprinkled in increases the count by a value of 3 (see arrow P). In the case of a threshold value of 13 and a possible, lower count of 1, it is apparent that up to 4 faults may be tolerated without a fault reaction occurring or the system resetting. When these parameters are set, the system has a high availability and high tolerance, and at the same time, a relatively long reaction time. In the exemplary embodiment of FIG. 4, the typical reaction time R is 4 cycles. For example, 4 fault occurrences are represented by high-voltage flashes, whose occurrence at a time $t_F$ results in a reset (not shown), since the threshold value is exceeded at point $y(t_F)$.

Using FIG. 5, it is now explained how a shorter reaction time may be attained.

According to the specific embodiment of FIG. 5, it can be seen that the counter level A having a count of 7 is active. In other words, a decrease in the count below the value of 7 is not permitted. Consequently, this specific embodiment typically tolerates just one fault, before a fault reaction results from threshold value 13 being reached. In this case, reaction time R is only two cycles. For purposes of illustration, high-voltage flashes and points $t_F$ and $y(t_F)$ are once again shown.

Finally, it should be pointed out that it would also be possible to make the threshold value variable. In this case, one could also dispense with varying the lower counter level.

What is claimed is:

1. A system to monitor equipment for measuring, controlling, and regulating, comprising:
   a monitoring device for monitoring a functioning of the equipment in order to detect a malfunction of the equipment and control an operating state of the equipment; and
   at least one counter, a detection of the malfunction increasing a count of the at least one counter, a first count of the at least one counter being provided, at least one of a reset and a fault reaction may be triggered in response to the first count being one of reached and exceeded, wherein:
   a difference between the count and the first count is reduced by an artificially generated malfunction that causes an increase in the count and is input into the system.

2. The system as recited in claim 1, wherein:
   the monitoring device checks the functioning of the equipment by using communications operations carried out between the monitoring device and the equipment in regular intervals, and
   each communications operation reveals one of the malfunction and a correct functioning.

3. The system as recited in claim 1, wherein:
   a detection of a correct functioning causes the count of the at least one counter to decrease.

4. The system as recited in claim 1, wherein:
   the count is controlled independently of an occurrence of the malfunction.

5. The system as recited in claim 1, wherein:
   the first count is compared to a threshold value,
   a second counter level lying below the threshold value is defined,
   the count of the at least one counter is not allowed to fall below the second counter level, and
   the artificially generated malfunction that increases the count is input into the system in response to the second counter level being reached.

6. The system as recited in claim 5, wherein:
   at least one of the second counter level and the threshold value is variable.

7. The system as recited in claim 1, wherein:
   the at least one counter includes a first fault counter assigned to the monitoring device and a second fault counter assigned to the equipment, and
   the first fault counter and the second fault counter are periodically at least one of checked and compared to each other in order to monitor the system.

8. The system as recited in claim 7, wherein:
   the first fault counter counts a representation of a count of the second fault counter.

9. The system as recited in claim 8, wherein:
   the at least one counter includes a third fault counter that compares a count of the first fault counter and the count of the second fault counter.

10. A method to monitor equipment for measuring, controlling, and regulating, comprising:
    causing a monitoring device to check a functioning of the equipment;
    detecting a malfunction that occurs;
    controlling an operating state of the equipment;
    increasing a count of at least one counter in response to the malfunction being detected;
    providing a first count;
    triggering at least one of a reset and a fault reaction in response to the first count being one of reached and exceeded; and
    reducing a difference between the count and the first count by an artificially generated malfunction that causes an increase in the count.

11. The method as recited in claim 10, wherein:
    the functioning of the equipment is implemented by using communications operations carried out between the monitoring device and the equipment in regular intervals, and
    each communications operation reveals one of the malfunction and a correct functioning.

12. The method as recited in claim 11, further comprising:
    registering the correct functioning by reducing the count of the at least one counter.

13. The method as recited in claim 10, further comprising:
    controlling the count independently of an occurrence of the malfunction.

14. The method as recited in claim 10, wherein:
    the first count is compared to a threshold value,
    a second counter level lying below the threshold value is defined,
    the count of the at least one counter is not allowed to fall below the second counter level, and
    the artificially generated malfunction that increases the count is input into the system in response to the second counter level being reached.

15. The method as recited in claim 14, further comprising:
    varying at least one of the second counter level and the threshold value in order to set one of a desired availability and a reaction time.

* * * * *